United States Patent
Hehl

(10) Patent No.: US 6,655,947 B1
(45) Date of Patent: Dec. 2, 2003

(54) INJECTION MOLDING MACHINE WITH A PROTECTIVE COVER

(76) Inventor: Karl Hehl, Arthur-Hehl-Stasse 32, D-72290, Lossburg (DE)

( * ) Notice: Subject to any disclaimer, the term of this patent is extended or adjusted under 35 U.S.C. 154(b) by 0 days.

(21) Appl. No.: 10/110,492
(22) PCT Filed: Oct. 10, 2000
(86) PCT No.: PCT/EP00/09934
§ 371 (c)(1),
(2), (4) Date: Apr. 15, 2002
(87) PCT Pub. No.: WO01/28748
PCT Pub. Date: Apr. 26, 2001

(30) Foreign Application Priority Data

Oct. 16, 1999 (DE) .......................................... 199 49 958

(51) Int. Cl.⁷ .............................................. B29C 45/84
(52) U.S. Cl. .................................. 425/151; 425/DIG. 45
(58) Field of Search ........................... 425/151, DIG. 45

(56) References Cited

U.S. PATENT DOCUMENTS 4,382,763 A    5/1983 Hehl

FOREIGN PATENT DOCUMENTS

| DE | 12 34 975 | 2/1967 |
|----|-----------|--------|
| DE | 42 27 336 | 3/1994 |
| EP | 0 583 639 | 2/1994 |
| GB | 956 814   | 4/1964 |

OTHER PUBLICATIONS

NETSTAL. Fur eine erfolgreiche Zukunft., SynErgy D 10/95, Art FALK, Repro FALK, Druck GSD, 3 pages.

Primary Examiner—Tim Heitbrink
(74) Attorney, Agent, or Firm—Cantor Colburn LLP

(57) ABSTRACT

The invention relates to an injection molding machine that is provided with a protective cover that can be displaced from a non-protective to a protective position by way of a handle and that is used to cover the injection molding nozzle during the injection process. The protective cover is axially configured in a substantially parallel position with respect to the axis of injection and can be displaced to a protective position. The protective cover comprises a lower part on which an upper part is mounted so as to be swiveled about a substantially parallel swivel axis with respect to the axis of injection. The lower part and the upper part can be displaced together to a non-protective and to a protective position, thereby combining a reliable support of the protective cover with accessibility of the nozzle and the plastification cylinder.

12 Claims, 5 Drawing Sheets

INJECTION MOLDING MACHINE WITH A PROTECTIVE COVER

BACKGROUND OF THE INVENTION

1. Field of the invention

The invention relates to an injection molding machine for the processing of plastics materials and other plasticizable substances having a protective cover for an injection nozzle.

2. Description of Related Art

The pamphlet "Synergy, interaction of forces" by Netstal-Maschinen AG, 875 Näfels/Switzerland makes known an injection molding machine with this type of nozzle protection. The nozzle protection is displaceable in the direction of the axis of injection and runs on rails, which at the same time serve to enable the nozzle to be positioned on the stationary mold carrier. Guide braces are secured to the stationary mold carrier for this purpose. However, there is no protection against an attack from underneath. In addition, the cover is simply placed loosely in position, which means that vibrations can cause it to shake itself loose and, consequently, it does not provide any reliable protection.

The disposing of nozzle protection of this type is also known, where there is a lower, fixed section as well as an upper section, which can be removed from the lower section. The fixed arrangement of the nozzle protection makes it difficult to access the nozzle and the plasticizing cylinder.

A protective arrangement for a plastics material injection moulding machine having at least two injection moulding units is known in DE 1 234 975 B. As the usual axially displaceable protective arrangement can no longer cover the nozzle region properly in this case, adaptors are provided here for the extension of the braces, via which the second injection moulding unit, standing vertically, is supported. A two-part protection, which is disposed in a fixed manner in the axial direction, is disposed on these extension pieces. One of the two parts can certainly be pivoted out around a hinge-joint.

BRIEF SUMMARY OF THE INVENTION

Proceeding from the state of the art, it is the object of the present invention to provide an injection molding machine with nozzle protection, which combines reliable protection with good accessibility.

This object is achieved through an injection molding machine for the processing of plastics materials and other plasticizable substances comprising: an injection mold assembly, accommodated between mold carriers in a mold clamping area, an injection molding unit for injecting the plasticizable substances into a central mold cavity of the injection mold assembly along an axis of injection, a plasticizing cylinder accommodated in the injection molding unit, an injection nozzle at an end of the plasticizing cylinder facing the injection mold assembly, said nozzle is adjacent an injection opening in the injection mold assembly during an injection process, a protective cover for covering the injection nozzle in a protective position during the injection process, said cover can be transferred from and into the protective position guided in an axial manner substantially parallel to the axis of injection, wherein the protective cover has a lower section, on which an upper section is mounted so as to be pivotable around a pivotal axis which is disposed substantially parallel relative to the axis of injection, and the lower section and the upper section are transferable together from and into the protective position.

The protective cover comprises an upper section and a lower section, which preferably surround the nozzle entirely. Where required, upper and lower section can be transferred out of and into the protective position together, which means that good accessibility is guaranteed, which can be increased even more by the upper section being pivotable relative to the lower section. This simplifies, for example, the removal of the plasticizable cylinder, it also being possible, at the same time, to remove the whole protective cover when work on the nozzle is to be carried out.

BRIEF DESCRIPTION OF THE DRAWINGS

The invention is described in more detail below by way of an exemplified embodiment. In which.

DETAILED DESCRIPTION OF THE INVENTION

The invention is now described in more detail as an example with reference to the enclosed drawings. The exemplified embodiments are certainly only examples, which are not to limit the inventive concept to a specific arrangement.

Figure 1:
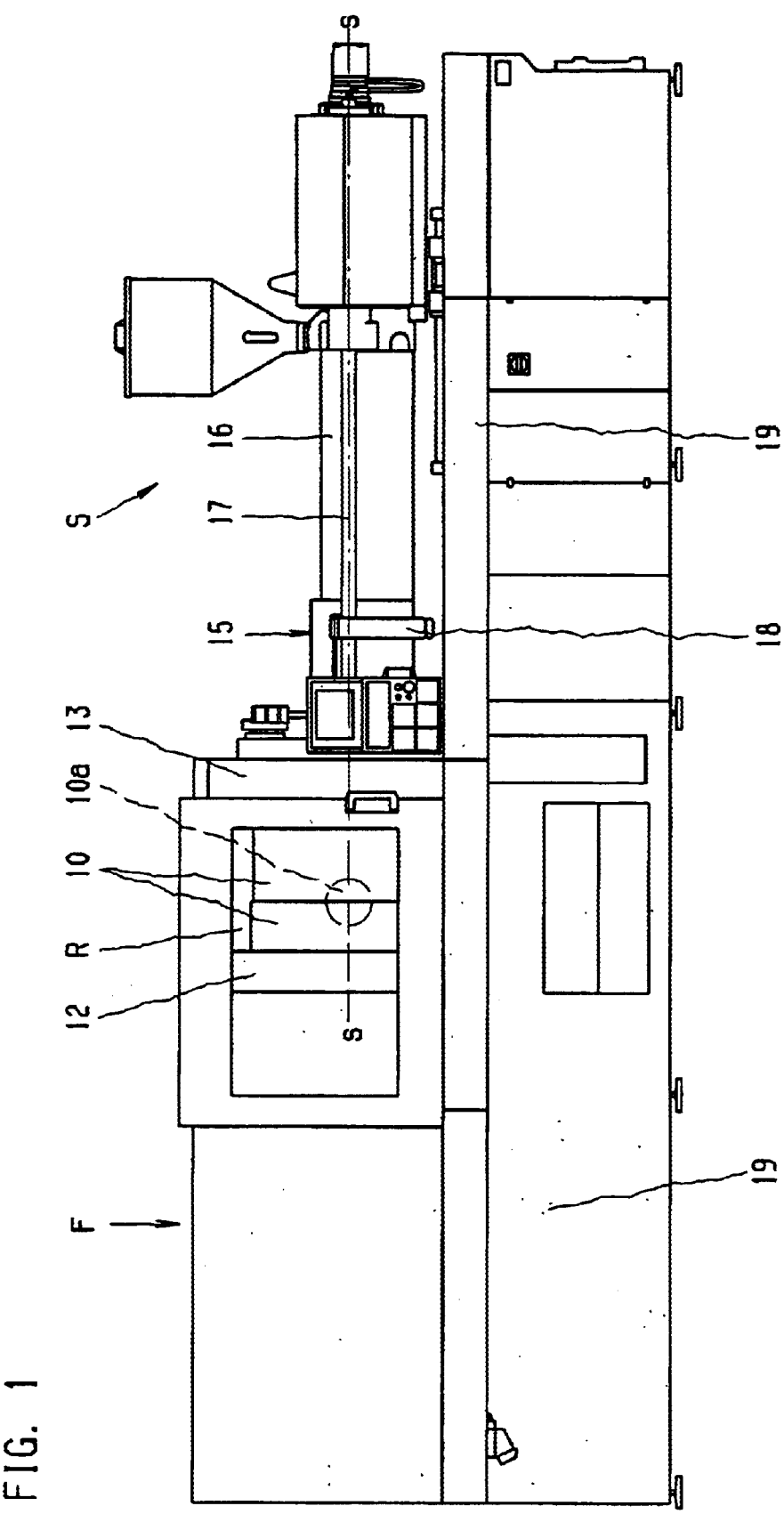
FIG. 1 is a front view of an injection molding machine.

FIG. 1 shows an injection molding machine, which is for the processing of plastics materials and other plasticizable substances, such as ceramic or powdery substances. The injection molding machine has a mold closing unit F and an injection molding unit S on a machine foot 19. An injection mold assembly 10 is accommodated in the mold closing unit in a mold clamping area R between the displaceable mold carrier 12 and the stationary mold carrier 13. The injection mold assembly has a central mold cavity 10a, into which the injection molding unit S injects the plasticizable substances along an axis of injection s-s. A plasticizing cylinder 16 is accommodated in the injection molding unit S itself.

Figure 4:
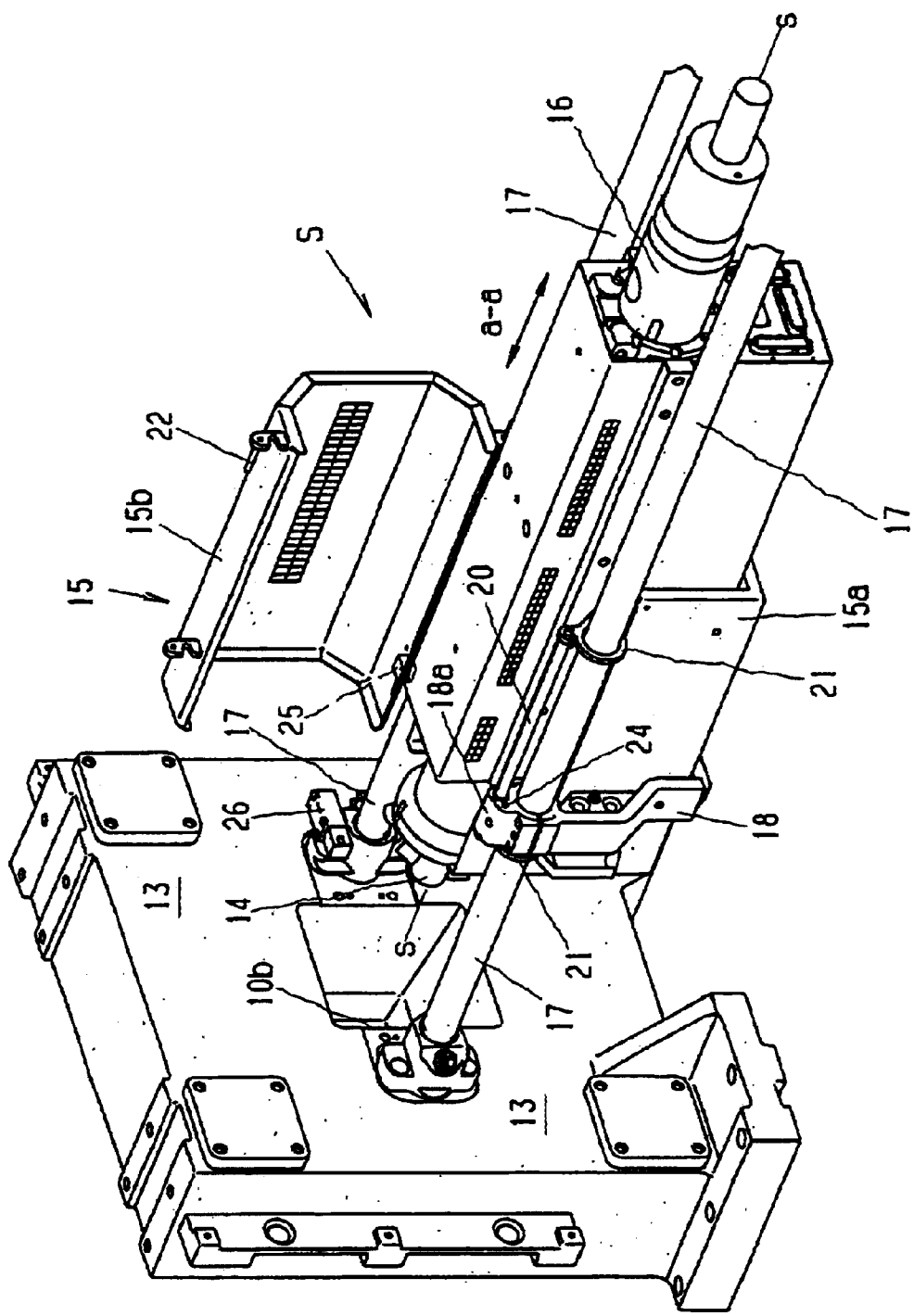
FIG. 4 is a representation as in FIG. 3 with the upper section of the protective cover in the pivoted position.

As shown in FIG. 4, an injection nozzle 14 is disposed at the front of the injection molding unit S at the end of the same facing the injection mold assembly 10, which injection nozzle comes to rest at an injection opening 10b of the injection mold assembly 10 during the injecting process. The injection nozzle 14 can only be seen in FIG. 4 as normally it is covered by a protective cover 15 at least during the injecting process. The protective cover, guided in an axial manner substantially parallel to the axis of injection, can be transferred into and out of the protective position.

The protective cover 15 has a lower section 15a, in which an upper section. 15b, as can be seen in FIG. 4, is mounted so as to be pivotable around a pivotal axis, which is disposed substantially parallel to the axis of injection s-s. Nevertheless, lower section 15a and upper section 15b can be transferred together out of the protective position as in FIG. 2 and out of the protective position as in FIG. 3. Guide columns 20 are used as guiding members and are mounted on the support bracket 18 via ball boxes and shafts (seen the best in FIG. 5). The entire lower section, and consequently the upper section 15b connected thereto, is also mounted on this support bracket-via these guide columns. Other members can also be provided in place of the support.bracket. It is also possible to use other members for the guiding, such as, for example, the guide braces themselves.

Figure 3:
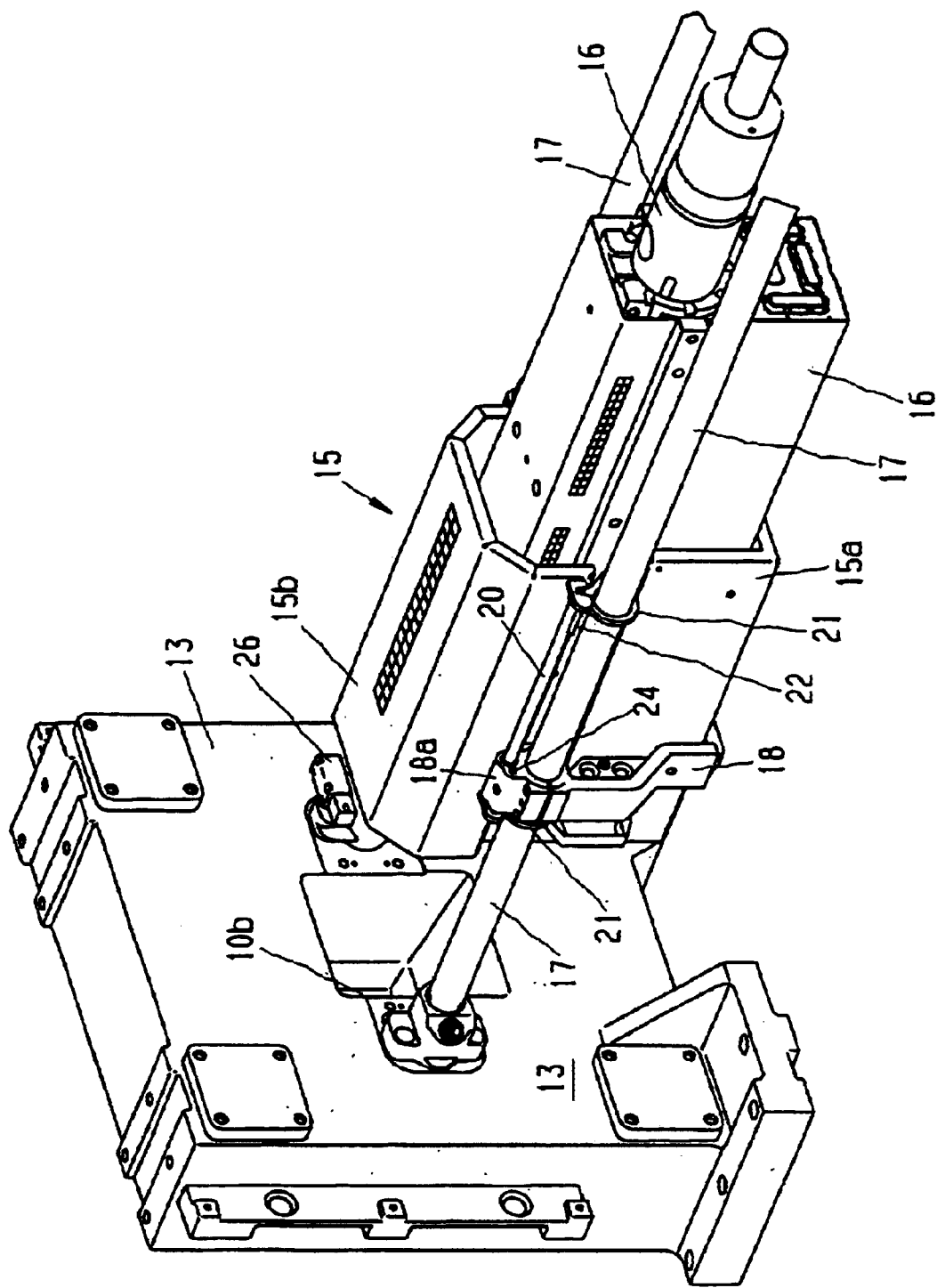
FIG. 3 is a representation as in FIG. 2 with the protective cover pushed back and the plasticizing cylinder retracted.
Figure 5:
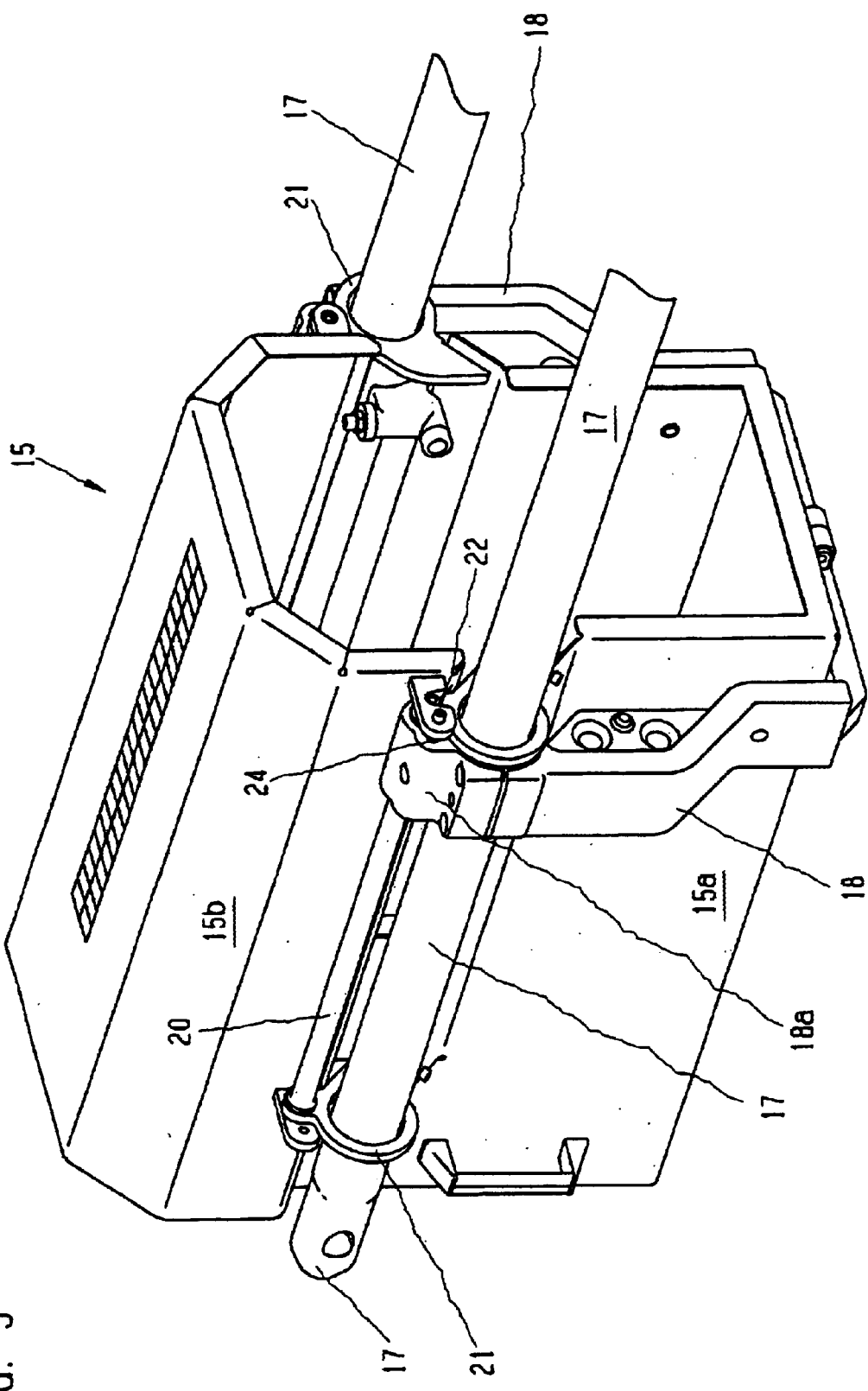
FIG. 5 is a three-dimensional representation to illustrate the design of the protective cover.

The injection molding unit S can be supported on the machine foot via the support bracket 18. In the exemplified embodiment, the only object of the support bracket, which is not connected to the machine foot 9 in this case, is as guiding member for the plasticizing unit and as mounting support for the guide columns 20. This also enables the injection mold unit S to pivot without any problems. The guide columns 20 are mounted in an integral profile. 16a of the support bracket, one of which guide columns at the same time forming the pivotal axis a-a. As can be seen in FIGS. 3–5, the guide columns extend parallel relative to the guide braces 17, via which the injection molding unit S is secured in a detachable manner on the stationary mold carrier 13. The guide columns 20 themselves are loosely connected also to the guide braces via sliding members 21. FIG. 5 shows the gap between the sliding members 21 and the guide braces. The guide braces 17 pass through these circular sliding members 21 and retain this gap in such a manner that the sliding members 21 can come to rest on the guide braces 17 when the protective cover 15 is put under stress. In the exemplified embodiment, moreover, the sliding members 21 are disposed at the ends of the guide columns 20. In this way they are able to cope with the normal stress on the protective cover when moving into and out of the protective position. However, to achieve overload protection, the sliding members, which retain the gap between the protective cover and the guide braces, are provided so that where there is a corresponding stress, this gap can be easily overcome by releasing the mounting of the guide columns.

Figure 2:
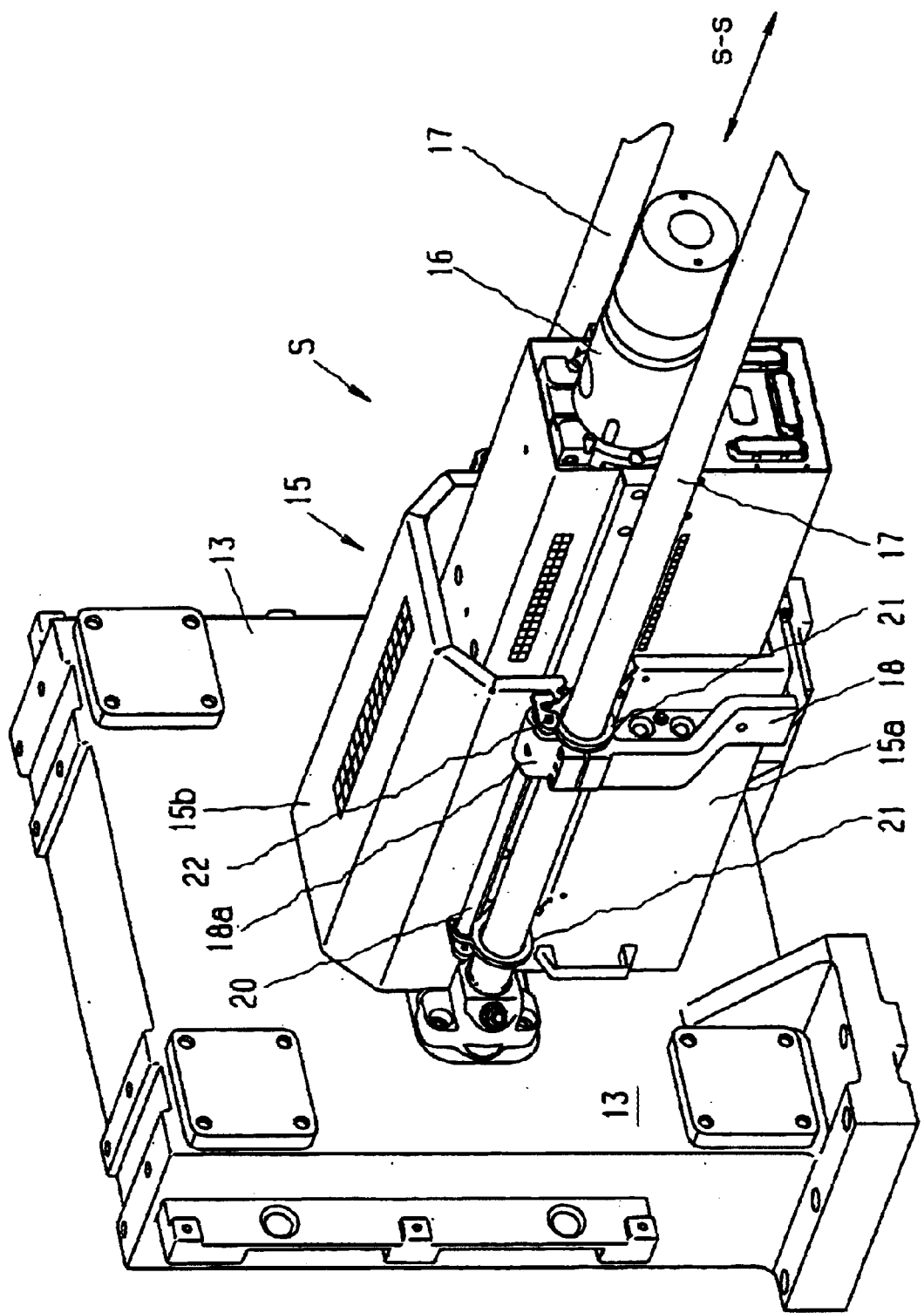
FIG. 2 is an enlarged, three-dimensional view of plasticizing cylinder and stationary mold carrier with the protective cover in the closed position.

When the unit is displaced, the following displacement sequence occurs:

Commencing with the position as shown in FIG. 2, in which the guide column 20 is abutting the integral profile 18a with its rear end, the protective cover 15 is transferred into the position shown in FIG. 3. To achieve this, the front sliding member 21 moves to abut the support bracket 18. The entire protective cover 15 is nevertheless at this time only guided in the integral profiles 18a, this displacement causing the guide column 20, as can be seen when comparing FIG. 2 and FIG. 3, to be pushed through the integral profile 18a. This displacement produces at the most a loose contact between sliding member 21 and guide brace 17. If, however, an external stress is applied to the protective cover, for example, if a user puts his foot on the protective cover, it would be impossible for the ball boxes and shafts in the integral profile 18a of the support bracket to cope. At this time, the gap between sliding member 18 and guide brace 17 is reduced such that one abuts the other and additional supporting of the protective cover on the guide braces 17 is achieved.

FIGS. 4 and 5 show how upper section 15b and lower section 15a are interlocked to enable them to be displaced together. The upper section 15b has a locking pin 22 extending in the direction of the axis of injection s-s. This locking pin interacts with a recess 24 of the support bracket 18. Before the upper section 15b of the protective cover 15 can be pivoted, the locking pin 22 must be removed from the recess 24 of the support bracket 18 by pushing back the protective cover. The mounting of the upper section 15b can also be configured such that a relative displacement between upper section 15b and lower section 15a is necessary to release the locking pin 22, for example, from a recess in the lower section 15a. Where required, suitable locking mechanisms, which require a conscious unlocking procedure before the upper section 15b can be pivoted, can be provided either on a supporting member 18, on another arbitrary member suitable for this or on the lower section.

FIG. 4 shows a safety mechanism which puts the injection molding unit out of action as soon as the protective cover 15 is moved out of its protective position, as shown in FIG. 2. To this end, a switch 26, such as, for example, an approach switch, is provided, which records whether the protective cover 15 is located abutting against the stationary mold carrier 13. The switch 26, in the exemplified embodiment, is disposed in the connecting region of the guide braces, it can, however, also be mounted on the stationary mold carrier. In addition, as shown in FIG. 4, a switching member 25, in the form of a switching finger, is used, which takes care of the corresponding contacting.

It goes without saying that this description can be subject to the most varied modifications, changes and adaptations, which vary in the region of equivalents to the attached sub claims.

What is claimed is:

1. Injection molding machine for the processing of plastics materials and other plasticizable substances comprising:
    an injection mold assembly, accommodated between mold carriers in a mold clamping area,
    an injection molding unit for injecting the plasticizable substances into a central mold cavity of the injection mold assembly along an axis of injection,
    a plasticizing cylinder accommodated in the injection molding unit,
    an injection nozzle at an end of the plasticizing cylinder facing the injection mold assembly, said nozzle is adjacent an injection opening in the injection mold assembly during an injection process,
    a protective cover for covering the injection nozzle in a protective position during the injection process, said cover can be transferred from and into the protective position guided in an axial manner substantially parallel to the axis of injection,
    wherein the protective cover has a lower section, on which an upper section is mounted so as to be pivotable around a pivotal axis which is disposed substantially parallel relative to the axis of injection, and the lower section and the upper section are transferable together from and into the protective position.

2. Injection molding machine according to claim 1, wherein the injection molding unit comprises at least one support bracket which guides the protective cover.

3. Injection molding machine according to claim 2, further comprising guide columns mounted in the support bracket for guiding the protective cover and for displacement with the protective cover.

4. Injection molding machine according to claim 3, wherein one of the guide columns forms the pivotal axis.

5. Injection molding machine according to claim 1, wherein, for guiding the protective cover, guide columns are provided which extend parallel to guide braces, via which the injection molding unit is mounted on the mold carrier so as to be detachable.

6. Injection molding machine according to claim 1, wherein for guiding the protective cover, guide columns are provided, which slide on sliding members at a spacing above guide braces, via which the injection molding unit is secured on the mold carrier so as to be detachable.

7. Injection molding machine according to claim 6, wherein the guide braces pass through the sliding members and the spacing between the sliding members and the guide braces is such that, when the protective cover is put under a load, the sliding members abut against the guide braces.

8. Injection molding machine according to claim 6, wherein the sliding members are disposed at ends of the guide columns.

9. Injection molding machine according to claim 1, wherein upper section and lower section are interlocked for displacement together.

10. Injection molding machine according to claim 1, wherein the upper section, or respectively the lower section, has at least one locking pin, which extends in a direction of the axis of injection and interacts with a recess on the lower section, or respectively upper section, and for unlocking purposes, the upper section, or respectively lower section, is displaceable in the direction of the axis of injection relative to the lower section, or respectively the upper section, before the upper section can be pivoted around the pivotal axis.

11. Injection molding machine according to claim 10, wherein the recess is provided on a sliding member, which is displaceable together with the protective cover, and/or on an integral profile of a support bracket supporting the guide column.

12. Injection molding machine according to claim 1, wherein a switching member is provided on the protective cover, said switching member is in active communication with a switch disposed on the mold carrier and interrupts the operation of the injection molding unit when the protective cover is transferred out of the protective position.

* * * * *